2,894,907
Patented July 14, 1959

2,894,907
ACIDIZING WELLS

Jack Newcombe and Wayne S. Fallgatter, Tulsa, Okla., assignors to Cities Service Research and Development Company, New York, N.Y., a corporation of New Jersey No Drawing. Application February 6, 1957
Serial No. 638,451

19 Claims. (Cl. 252—8.55)

This invention relates to a new and improved method and composition for acidizing oil bearing formations. More particularly, this invention relates to a new and improved acidizing composition uniquely adapted for treating calcareous formations containing water sensitive minerals.

The continuous depletion of oil sand properties has caused increased interest to be focused on the recovery of oil from formations previously bypassed due to the extreme difficulties faced in recovering oil therefrom. One particular type of formation falling within the foregoing category is that generally referred to as a limestone or calcareous formation containing hydratable silicates.

Such formations are rather extensive and are known to contain considerable quantities of oil. Very little success has been attained, however, in recovering oil from such formations by conventional treating methods. This is due primarily to the presence of highly hydratable silicates which often comprise as much as 10% of the total formation. Experience has shown that treatment of such formations according to conventional acidizing techniques often results in a reduction in permeability rather than in permeability increase such as would be expected when treating a normal limestone formation according to standard techniques. This is due to the fact that the water sensitive minerals, particularly the hydratable silicate, mingled with the carbonate in the formation swell considerably in volume when contacted with acid or other treating solutions. This increase in the volume of the silicates causes a reduction in permeability and consequently a reduction in oil recovery.

This condition could be overcome if means were available to control or preferably prevent silicate swelling during acid treatment. Several attempts have been made with varying degrees of success but no acidizing composition or acidizing process presently available is sufficiently effective in view of the costs to warrant wide-spread commercial adoption.

It is accordingly an object of the present invention to provide a new and improved method and composition for the treatment of calcareous formations containing hydratable silicates.

It is another object of the present invention to provide a new method of acidizing limestone formations which contain hydratable silicates in a manner that reduces and prevents silicate swelling during acidizing.

It is another object of the present invention to increase the recovery of oil from calcareous formations and simultaneously protect the equipment utilized in the acidizing process.

It is a still further object of this invention to provide an improved acidizing process which can be used in conjunction with secondary recovery methods such as in water flooding for increasing oil production from formations containing swellable silicates.

It has been suggested in U.S. 2,713,033 that the addition of tetra-alkyl ammonium chloride to an acidizing solution will minimize swelling of silicates. Similarly U.S. 2,640,810 teaches that control of pH during acidizing of chalk will minimize the swelling of hydratable clays.

While the foregoing methods provide some control of silicate swelling, it has now been found that silicate swelling can be minimized and controlled far more effectively by means of the new and improved method and acid composition of the present invention.

It has been found that acidizing calcareous formations containing hydratable silicates according to the method of the present invention will provide permeability increases of 100 fold or more. In addition to providing control of silicate swelling during acidizing, the improved composition of this invention simultaneously provides substantial protection against the corrosive action of the acidizing solution on well tubing and associated equipment. In addition, the new acidizing solutions lower the interfacial tension of the oil and water present in the formation so that improved backflow of the acid solution from the formation to the well is obtained.

The foregoing objects and advantages are accomplished according to the present invention by including in a hydrochloric acidizing solution a small amount of an acid soluble bis-imidazoline having a molecular weight of from about 166 to 860. These bis-imidazoline compounds unexpectedly provide a unique control of the swelling of silicates during acidizing.

The bis-imidazoline is generally present in an amount of from 0.01 to about 2.0% by weight based on the total acid solution. Generally effective amounts of the bis-imidazoline are from about 0.1% to 1.0% a preferred amount being from about 0.4 to about 0.6%.

The aqueous solution of HCl will normally include from about 1 to 25% HCl. In conventional acidizing methods a 15% HCl solution is used. For purposes of the present invention, such a concentration of HCl is quite satisfactory. While hydrochloric acid is the preferred acid, other mineral acids such as nitric, hydrofluoric, hydrobromic, sulfuric, or sulfamic acids may be used if desired.

While the presence of the bis-imidazoline in the HCl solution adds greatly to the effectiveness of the HCl solution when treating formations containing hydratable silicates, an even greater improvement in acidizing with aqueous HCl can be obtained if there is combined with the HCl a low molecular weight monocarboxylic acid having from 1 to 5 carbon atoms. It has been found that adding to the solution of HCl and bis-imidazoline an organic acid in an amount of from about 0.5 to 25% will provide even greater permeability increases when treating formations containing hydratable silicates. Generally effective amounts of the organic acid will be from about 5 to 20%. The improved result obtained by the presence of the organic acid is not easily explained, though it appears that the organic acid in some way enhances the effectiveness of the HCl without interfering or adversely affecting the anti-swelling characteristics of the solution provided by the bis-imidalozine.

Suitable organic acids for this purpose are formic, acetic, propionic, butyric, and valeric acids. Other organic acids, such as the low molecular weight dicarboxylic acids could be used, but the limited solubility of the calcium salts of the formations in such acids limits their application to the present invention. The use of higher molecular weight organic acids is limited somewhat by cost but more particularly by their limited solubility in hydrochloric acid. Accordingly, low molecular weight acids having 5 carbon atoms or less are preferred.

The anti-swelling agents utilized are the acid soluble bis-imidazolines having a molecular weight from about 166 to 860. These particular compounds when added to the acid solution provide unexpected but substantial reduction in silicate swelling. The effectiveness of these bis-imidazoline compounds in providing the desired control of silicate swelling will be clearly demonstrated hereafter. The bis-imidazoline compound is added to the HCl acid or the HCl and organic acid mixture in an amount of from about 0.01% to about 2% by weight of the total acid mixture. It has been found that increasing the amount of the bis-imidalozine above 2% does not materially increase the efficiency of the acidizing solution in controlling silicate swelling. This effect may be attributed to an inhibiting of the action of the acid on the carbonate in the formation.

The bis-imidazoline anti-swelling agent is generally represented by the following formula:

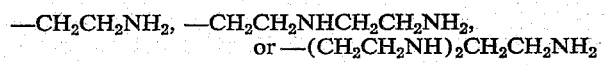

In the foregoing formula R represents the residue of a dicarboxylic acid having from 4 to about 34 carbon atoms which will be in the form of one of the following groups: alkylene, arylene, alkylarylene, arylalkylene, cycloalkylene. The R group may include such substituents as hydroxyl or halogen though normally the unsubstituted acids will be preferred; A and $A^1$ will be H or one of the following:

—$CH_2CH_2NH_2$, —$CH_2CH_2NHCH_2CH_2NH_2$,
or —$(CH_2CH_2NH)_2CH_2CH_2NH_2$

The A and $A^1$ groups may be like or unlike depending on the amine used in the preparation and the manner in which ringing formation is accomplished.

In preparing the bis-imidazoline the selected polyamine and dicarboxylic acid are condensed in a molar ratio of 2:1. To accomplish this the reaction mixture is heated to a temperature of from about 105° C to about 200° C, for a period of from 1 to 6 hours. The time will depend on the temperature at which the mixture is refluxed. The water of condensation, which will amount to 4 mols for each mol of dicarboxylic acid used, is distilled directly from the reaction mixture or is removed by means of an azeotrope forming solvent, such as benzene, toluene, xylene, and the like. If such a solvent is used, reflux is carried out at a temperature near the boiling point of the particular solvent used.

It has been found that the bis-imidazoline compounds used in this invention can be improved under certain conditions by adding thereto limited amounts of an olefin oxide. The addition of from 0.5 to 5 mols of an olefin oxide, preferably ethylene oxide, to the final bis-imidazoline compound will improve the solubility of the bis-imidazoline in acid solution and increase its effectiveness as an anti-swelling agent.

Under certain circumstances, however, the addition of ethylene oxide may not be desirable if the addition decreases the effectiveness of the bis-imidazoline compound in controlling silicate swelling. When the bis-imidazoline is prepared from higher molecular weight amines and low molecular weight acids, ethylene oxide addition is not generally preferred. However, if low molecular weight amines are reacted with high molecular weight acids, the addition of ethylene oxide may be helpful. The position at which the ethylene oxide adds to the bis-imidazoline has not been fully determined; however, it will be quite apparent that its presence generally adds to the effectiveness of the bis-imidazolines in controlling clay swelling. This will be evident from Table I and the description which follows.

In preparing the bis-imidazoline anti-swelling compound utilized in the acid solution, the preferred polyethyleneamines are ethylene diamine, diethylene triamine, triethylene tetramine, and tetraethylene pentamine. Higher molecular weight polyamines may be used if available, but the use of such compounds when reacted with high molecular weight acids and aldehydes would produce final bis-imidazoline compounds having molecular weights outside of the effective molecular weight range.

The dicarboxylic acid used in preparing the bis-imidazolines will be an acid having from 4 to 36 carbon atoms. The acid may be of saturated or unsaturated character and may be of straight, branched, or ring configuration. Substituted acids may be used. Among the dicarboxylic acids which may be satisfactorily used are: succinic, dimethyl succinic, glutamic, adipic, pimelic, suberic, azelaic, sebacic, dimerized fatty acids such as dimerized linoleic, terephthalic, phthalic, maleic, citraconic, mesaconic, itaconic, glutaconic, and muconic acids. Substituted dicarboxylic acids such as malic, mucic, diglycollic, and chlorosuccinic may also be used.

To better understand the nature of the bis-imidazoline anti-swelling agents and the manner of preparing the same, the following example is provided:

To about 37.9 grams (0.2 mol) of TEPA, 56.1 grams (0.1 mol) of dimerized linoleic acid is added with mixing. Approximately 50 ml. of xylene is added to the mixture. The mixture is then refluxed at a temperature of about 145° C. for about 6 hours. During the reflux period, water is continuously removed in a decanter type still until approximately 7.2 grams or 0.4 mol of water has been collected. Recovery of this amount of water indicates the formation of the bis-imidazoline rings.

At this time reflux is discontinued and the xylene azeotrope-forming solvent is distilled from the reaction mixture. After the reaction mixture has cooled, the final product may be diluted with an inert solvent such as isopropyl alcohol and ethylene oxide slowly added while stirring in a closed vessel. A sharp rise in temperature will be noted but very little rise in pressure is noted, indicating the addition of the ethylene oxide to the bis-imidazoline compound. During addition of the ethylene oxide, the solution is maintained at a temperature of about 80° C. After approximately 0.4 mol of ethylene oxide is added to the bis-imidazoline compound, no further ethylene oxide is added. The isopropyl alcohol may be distilled from the mixture, the reaction mixture cooled, and solubility of the anti-swelling composition tested in HCl and acetic acid.

The final oxyethylated bis-imidazoline compound of the above example is identified as compound B in Table I which follows.

In a substantially similar manner, any of the compounds identified in Table I which follows can be prepared by adhering to the conditions set forth in the foregoing example.

For example, the bis-imidazoline anti-swelling agent identified as compound P is prepared as follows: to about 20.6 grams (0.2 mol) of diethylene triamine 56.1 grams (0.1 mol) of dimerized linoleic acid is added with mixing. Fifty ml. of toluene is added to the reaction mixture, and the mixture refluxed for a period of about 6 hours at a temperature of about 115° C. Refluxing is conducted in a decanter type still with a means provided to collect water of condensation separated as an azeotrope. The collection of about 7.2 grams of water (0.4 mol) indicates the formation of the bis-imidazoline ring. After the bis-imidazoline ring formation is assured, the toluene solvent is distilled from the reaction mixture. The reaction mixture is thereafter cooled, dissolved in an equal volume of isopropyl alcohol and treated at 80° C., with 8.8 grams (0.2 mol) of ethylene oxide. This quantity of ethylene oxide (0.2 mol) would correspond to 2 mols of ethylene oxide if 2 mols of amine and 1 mol of dimer acid were used in preparing the product. After addition of ethylene oxide is completed, the alcohol solution is distilled and the anti-swelling agent identified as compound P in Table I.

In Table I, data is provided showing the comparative effectiveness of the various imidazoline compounds in controlling the swelling of hydratable silicates. Table I is based on a series of tests carried out on 12-gram crushed samples obtained from a chalk formation containing approximately 0.7 gram of acid insoluble hydratable silicates. In conducting the test, like crushed samples were placed in graduated cylinders and treated with equal amount of HCl. One acid solution used in treating had added thereto the indicated amount of the bis-imidazoline. This was contrasted with a control sample of chalk of like amount treated with acid containing no anti-swelling agent. The column headed "Percent reduction in clay volume" is based on a visual comparison between the volumes of hydratable clays present in the two cylinders.

Typical examples of suitable acid compositions with and without the organic acid follow:

EXAMPLE 1

| | Weight percent |
|---|---|
| Hydrochloric acid | 18.0 |
| TETA, succinic acid (2:1), Compound F, Table I | 1.0 |

EXAMPLE 2

| | |
|---|---|
| Hydrochloric acid | 6.0 |
| DETA, dimer acid, ethylene oxide (2:1:2), Compound P, Table I | 0.3 |

TABLE I
*Anti-swelling and acid inhibiting properties of bis-imidazoline compounds*

| No. | Conc., Percent | Composition or Reaction | Mol Ratio | Nature of Soln. | Percent Redn. in Clay Volume | Percent Acid Inhibition at 100 p.p.m. additive Conc. |
|---|---|---|---|---|---|---|
| Control | | 15% HCl only | | Clear | 0 | |
| Com. A | 0.5 | | | Dispersion | 35 | 65.8 |
| | 0.5 | | | do | 46 | 40.6 |
| | 0.5 | DETA [1] | | Clear | 8 | |
| Com. B | 0.5 | TETA [2] | | do | 24 | |
| | 0.5 | TEPA [3] | | do | 23 | |
| | 16.6 | Oleic Acid | | Dispersion | (57 incr.) | |
| A | 0.5 | TEPA Dimer Acid | 2:1 | do | 50 | 83.1 |
| B | 0.5 | TEPA Dimer Acid Etoxide | 2:1:4 | Clear | 48 | 98.1 |
| | 0.1 | TEPA Dimer Etoxide | 2:1:4 | do | 30 | 98.1 |
| | 0.3 | do | 2:1:4 | do | 46 | 98.1 |
| B | 0.5 | do | 2:1:4 | do | 44 | 98.1 |
| | 1.0 | do | 2:1:4 | do | 43 | 98.1 |
| D | 0.5 | TETA Dimer Acid | 2:1 | Dispersion | 49 | 83.7 |
| E | 0.5 | TETA Dimer Acid Etoxide | 2:1:4 | Clear | | 97.0 |
| F | 0.5 | TETA Succinic | 2:1 | do | 41 | 92.9 |
| G | 0.5 | TETA Succinic Etoxide | 2:1:4 | do | | 99.1 |
| H | 0.5 | do | 2:1:1 | do | 35 | |
| I | 0.5 | TETA, tere-Phthalic | 2:1 | Dispersion | 8 | 89.9 |
| J | 0.5 | TETA, tere-Phthalic Etoxide | 2:1:4 | do | | 98.7 |
| K | 0.4 | TETA, Mucic | 2:1 | Clear | 35 | 81.9 |
| L | 0.5 | TETA, Mucic Etoxide | 2:1:4 | do | | 96.0 |
| M | 0.5 | TETA, Sebacic | 2:1 | do | 24 | 94.2 |
| N | 0.5 | TETA, Sebacic Etoxide | 2:1:4 | do | | 96.1 |
| O | 0.5 | DETA Dimer | 2:1 | Dispersion | 52 | 81.0 |
| P | 0.5 | DETA Dimer Etoxide | 2:1:2 | Clear | 43 | 96.1 |
| B) mixed | 0.4 | TEPA Dimer Etoxide | 2:1:4 | do | 46 | |
| D) | 0.1 | TETA Dimer | 2:1 | | | |

[1] Diethylene triamine.
[2] Triethylene tetramine.
[3] Tetraethylene pentamine.

It will be evident from the table above, that the bis-imidazoline compounds in addition to minimizing clay swelling, possess important corrosion inhibiting properties which are most advantageous in minimizing the corrosive action of the acid solution.

The presence of the bis-imidazoline in the HCl acid solution is important in addition to controlling swelling of the silicate and providing protection against the corrosive action of the acid, in reducing the oil-water interfacial tension in the formation as previously indicated. This characteristic of the acid solutions of this invention provided by the bis-imidazoline compounds is most important. Normally in conventional acidizing procedures, spent acid is often held in the formation by capillary forces. This action inhibits the flow of spent acid and oil to the well bore after treatment. If the oil-water interfacial tension is sufficiently low, the spent acid will flow back into the well more readily, thus permitting easier flow of oil to the well.

The acid solutions of the present invention are broadly defined as follows:

| | Weight percent |
|---|---|
| HCl | 1-25 |
| Bis-imidazoline (acid sol., mol. wt. 166-860) | 0.01-2.0 |

When the organic acid is used, the acid solution will have the following composition:

| | Percent |
|---|---|
| HCl | 1-25 |
| Organic acid (1-5 carbon) | 0.5-25 |
| Bis-imidazoline (acid sol., mol. wt. 166-860) | 0.01-2.0 |

EXAMPLE 3

| | |
|---|---|
| Hydrochloric acid | 13.0 |
| TEPA, dimer acid, ethylene oxide (2:1:4), Compound B, Table I | 2.0 |

EXAMPLE 4

| | |
|---|---|
| Hydrochloric acid | 7.5 |
| Formic acid | 11.1 |
| TEPA, dimer acid, ethylene oxide (2:1:4), Compound B, Table I | 0.5 |

EXAMPLE 5

| | |
|---|---|
| Hydrochloric acid | 12.8 |
| Acetic acid | 2.9 |
| Butyric acid | 2.2 |
| DETA, dimer acid, ethylene oxide (2:1:2), Compound P, Table I | 0.3 |

EXAMPLE 6

| | |
|---|---|
| Hydrochloric acid | 10.5 |
| Propionic acid | 10.9 |
| TETA, succinic acid (2:1), Compound F, Table I | 1.0 |

EXAMPLE 7

| | |
|---|---|
| Hydrochloric acid | 12.0 |
| Acetic | 5.9 |
| TETA, mucic acid (2:1), Compound K, Table I | 0.7 |

To test the effectiveness of the acid solutions of this invention, acidizing tests were carried out on cores obtained from a formation containing approximately 5.84% hydratable silicates. The cores tested were obtained from a formation having the following characteristics:

Core summary—R. Fee—Well A

| | |
|---|---|
| Depth, feet | 1391.0–1521.0 |
| Percent core recovery | 100 |
| Feet of permeable, productive formation recovered | 69.0 |
| Average permeability, millidarcies | 0.2 |
| Average porosity, percent | 27.7 |
| Average residual oil saturation, percent pore space | 31.4 |
| Gravity of oil, °API | 42.0 |
| Average total water saturation, percent pore space | 41.8 |
| Average calculated connate water saturation, percent pore space | 31.0 |
| Solution gas-oil ratio,[1] cu. ft./bbl. | 100.0 |
| Formation volume factor [1] | 1.10 |

[1] Determined by reduction in pressure from estimated saturation pressure to atm. pressure.

The results of the tests carried out on the cores obtained from the above formation are shown in Table II which follows. The tests were caried out on cores having a length of 2.25 cm. and a diameter of 1.9 cm. Each test core prior to acidizing was air-dried for 2 to 3 weeks and saturated with water and driven with kerosene to irreducible water saturation prior to acidizing. The acidizing was carried out on the individual cores with the acidizing composition identified. Each test core was first acidized with the solution indicated at 200 p.s.i. for ten minutes, 400 p.s.i. for ten minutes, 600 p.s.i. for ten minutes and thereafter at 1000 p.s.i. until acid breakthrough.

The effectiveness of the particular composition identified can be determined by reference to the breakthrough time and to the acid rating value. This acid rating value is based on the following expression:

$$\text{Acid rating} = \frac{L}{(B.T.)(Kw)(V)}$$

wherein L is the length of the core in centimeters; B.T., the time in minutes required for breakthrough of acid; Kw, the water permeability in millidarcies; and V, the volume of the fluid produced through the core at the time of acid breakthrough. The higher the acid rating, the more effective the particular acidizing solution is. It is, of course, to be understood that the composition of each core varies considerably even if obtained from the same formation at the same depth. This, of course, makes an absolute comparison between acid solutions very difficult; however, it will be quite evident that the acid solutions of the present invention are superior to HCl alone, or HCl and a selected organic acid, in increasing permeability by the control of silicate swelling they provide.

Referring now to Table II, it will be quite evident that the acid solutions of this invention are far superior to HCl alone or to a mixture of HCl and low molecular weight organic acids in acidizing formations containing hydratable silicates. For example, compare the results of test 3 in which no bis-imidazoline compound was used with test 8 in which 0.5% of agent P was added. The acid ratings are 0.241 and 1.20, respectively, demonstrating that the acid solution of test 8 is 5 times as effective. Similar or superior results will be noted in comparing test 1 with test 6, test 2 with test 7, test 3 with tests 9 or 10, test 4 with test 11, and test 5 with test 12.

In utilizing the acid compositions of the present invention, in treating formations containing hydratable silicates normal or conventional acidizing techniques will be used. The amount of acid solution will, of course, depend generally on the characteristics of the particular formation, the area to be treated and the desired increase in permeability.

In conventional acidizing techniques, the acid solution is introduced into the formation through the well tubing so as to come in contact with the formation to be treated. The acid solution may be introduced in single batch or in a series of slugs followed by a backing solution of oil or brine to insure contact of the acid with the formation. After a sufficient time has elapsed to spend the acid solution, the flush oil is pumped from the well and spent acid permitted to backflow into the well. After the spent acid has moved out of the formation it may be pumped from the well. If substantial increases in permeability are contemplated, it may be necessary to carry out repeated treatments of the formation. The acidizing compositions of the present solution can, of course, be used directly upon completion of a well, or on previously fractured or acidized wells, or they may be used in conjunction with secondary recovery processes, such as in water flooding.

While certain preferred embodiments of this invention have been described, it is to be understood that such description is not intended to limit the scope of this invention in any particular. The only limitations intended are those imposed by the claims appended hereto.

We claim:

1. A well treating composition comprising an aqueous solution containing from 1 to about 25% HCl, from 0.01 and 2% of an acid soluble bis-imidazoline having a molecular weight from 166 to 860 and from 0.5 to 25% of an aliphatic monocarboxylic acid having from 1 to 5 carbon atoms.

2. A well treating composition as claimed in claim 1 in which the aliphatic monocarboxylic acid is valeric acid.

3. A well treating composition as claimed in claim 1 wherein the aliphatic monocarboxylic acid is formic acid.

4. A well treating composition as claimed in claim 1 wherein the aliphatic monocarboxylic acid is acetic acid.

5. A well treating composition as claimed in claim 1 wherein the aliphatic monocarboxylic acid is propionic acid.

6. A well treating composition as claimed in claim 1 wherein the aliphatic monocarboxylic acid is butyric acid.

TABLE II

| | Core Number | Weight Percent Anti-Swell Agent | Weight Percent Hydrochloric | Weight Percent Organic | Perm., Md.[1] | B.T., Min. | Acid Rating |
|---|---|---|---|---|---|---|---|
| 1 | 113-7a | 0 | 15.0 | | 0.0741 | 355.0 | 0.016 |
| 2 | 151-4b | 0 | 10.5 | 6.8 Formic | 0.164 | 38.53 | 0.267 |
| 3 | 131-11a | 0 | 10.5 | 8.8 Acetic | 0.0546 | 74 | 0.241 |
| 4 | 110-1c | 0 | 10.5 | 10.9 Propionic | 0.0816 | 57.51 | 0.344 |
| 5 | 110-2a | 0 | 12.0 | 8.6 Butyric | 0.0942 | 68.42 | 0.234 |
| 6 | 113-7a1 | 0.5 P | 15.0 | 0.0 | 0.0663 | 52.73 | 0.490 |
| 7 | 151-3b | 0.5 P | 10.5 | 6.8 Formic | 0.0991 | 32.61 | 0.661 |
| 8 | 135-8b | 0.5 P | 10.5 | 8.8 Acetic | 0.395 | 43.0 | 1.20 |
| 9 | 131-59 | 0.5 H | 10.5 | 8.8 Acetic | 0.0637 | 38.4 | 0.824 |
| 10 | 131-12 | 0.5 B | 10.5 | 8.8 Acetic | 0.0395 | 43.0 | 1.20 |
| 11 | 110-1b | 0.5 P | 10.5 | 10.9 Propionic | 0.0734 | 38.61 | 0.798 |
| 12 | 115-22 | 0.5 P | 12.0 | 8.6 Butyric | 0.0446 | 32.65 | 2.192 |

[1] Permeability before acidizing in millidarcies.

7. A well treating composition comprising an aqueous solution containing from 1 to 25% of HCl, about 0.5% of an acid soluble bis-imidazoline having a molecular weight from 166 to 860 and from 0.5 to 25% of an aliphatic monocarboxylic acid having from 1 to 5 carbon atoms.

8. A well treating composition comprising an aqueous solution containing from 1 to 25% HCl, from 0.01 to 2% of an acid soluble bis-imidazoline having a molecular weight from 166 to 860 oxyethylated with from 0.5 to about 5 mols of ethylene oxide and from 0.5 to 25% of an aliphatic monocarboxylic acid having from 1 to 5 carbon atoms.

9. A well treating composition as claimed in claim 8 wherein the bis-imidazoline is oxyethylated with 2 mols of ethylene oxide.

10. A well treating composition comprising an aqueous solution containing about 15% HCl, about 15% butyric acid, and from 0.01 to 2% of an acid soluble bis-imidazoline having a molecular weight of from 166 to 860.

11. A well treating composition as claimed in claim 10 where the bis-imidazoline is oxyethylated with from 0.5 to 5 mols of ethylene oxide.

12. A process for acidizing a calcareous oil bearing formation containing hydratable silicates which comprises introducing into the formation an aqueous hydrochloric acid solution containing from 1 to 25% of HCl, from 0.01 to about 2% of an acid soluble bis-imidazoline having a molecular weight of from 166 to 860 and from 0.5 to 25% of an aliphatic monocarboxylic acid having from 1 to 5 carbon atoms.

13. A process for acidizing a calcareous oil bearing formation containing hydratable silicates as claimed in claim 12 in which the aliphatic monocarboxylic acid is acetic acid.

14. A process for acidizing calcareous oil bearing formation containing hydratable silicates as claimed in claim 12 in which the aliphatic monocarboxylic acid is formic acid.

15. A process for acidizing calcareous oil bearing formation containing hydratable silicates a claimed in claim 12 in which the aliphatic monocarboxylic acid is propionic acid.

16. A process for acidizing calcareous oil bearing formation containing hydratable silicates as claimed in claim 12 in which the aliphatic monocarboxylic acid is butyric acid.

17. A process for acidizing calcareous oil bearing formation containing hydratable silicates as claimed in claim 12 in which the aliphatic monocarboxylic acid is valeric acid.

18. A process for acidizing a calcareous oil bearing formation containing hydratable silicates as claimed in claim 12 wherein the bis-imidazoline is oxyethylated with from 0.5 to 5 mols of ethylene oxide.

19. A process for acidizing a calcareous oil bearing formation containing hydratable silicates as claimed in claim 18 wherein the bis-imidazoline is oxyethylated with 2 mols of ethylene oxide.

References Cited in the file of this patent

UNITED STATES PATENTS

| Number | Name | Date |
|---|---|---|
| 2,292,208 | De Groote et al. | Aug. 4, 1942 |
| 2,301,875 | Holmes | Nov. 10, 1942 |
| 2,400,395 | De Groote et al. | May 14, 1946 |
| 2,468,163 | Blair et al. | Apr. 26, 1949 |
| 2,713,033 | Caldwell et al. | July 12, 1955 |
| 2,761,836 | Brown et al. | Sept. 4, 1956 |

UNITED STATES PATENT OFFICE
CERTIFICATE OF CORRECTION

Patent No. 2,894,907                      July 14, 1959

Jack Newcombe et al.

It is hereby certified that error appears in the printed specification of the above numbered patent requiring correction and that the said Letters Patent should read as corrected below.

Column 3, line 31, for "ringing" read -- ring --; column 10, line 6, for "a claimed" read -- as claimed --.

Signed and sealed this 17th day of November 1959.

(SEAL)
Attest:

KARL H. AXLINE
Attesting Officer

ROBERT C. WATSON
Commissioner of Patents